Sept. 26, 1967     C. S. GIDDY     3,343,990

FUEL CELLS WITH WEFTLESS FABRIC COLLECTORS

Filed Dec. 31, 1963

INVENTOR:
CHARLES S. GIDDY
BY: *Millard L. Caldwell*
HIS ATTORNEY

3,343,990
FUEL CELLS WITH WEFTLESS FABRIC COLLECTORS

Charles S. Giddy, Heswall, England, assignor to Shell Oil Company, New York, N.Y., a corporation of Delaware
Filed Dec. 31, 1963, Ser. No. 334,736
Claims priority, application Great Britain, Jan. 3, 1963, 311/63
6 Claims. (Cl. 136—86)

This invention relates to electrical cells, particularly fuel cells in which fluid reactants are supplied to the electrodes of the cell for generation of electricity. It is particularly concerned with means for reducing the internal resistance of such cells and making them more efficient power generators.

A number of different forms of fuel cells have been used successfully. These provide pairs of electrodes of opposite polarity to each of which is supplied one of the reactive fluids which there contact a common electrolyte in the presence of a catalyst for the reaction. Aqueous acid and basic solutions, fused salts such as alkali carbonates, and solids such as ion exchange resins have all been used as electrolytes in cells of this kind. Great efforts have been made to produce cells which are light in weight and compact but these desirable characteristics have not been obtainable in combination with a low internal resistance. This has been mainly due to the high electrical resistance offered by the conductive surfaces of the electrodes as heretofore constructed. This resistance has limited the power output obtainable from the cells.

It is an important object of the present invention to minimize the foregoing disadvantages of previous fuel cells and to provide cells of low weight and internal resistance capable of greater power output.

These objects are accomplished according to the invention by providing a special form of current bearing element for face to face contact with the electrode of a fuel cell. This current bearing element comprises a sheet of foraminous material of special construction which affords good electrical conduction from the electrode and presents a multiplicity of channels affording ready acessibility to fluids from point to point of its area. By these means, the conductive surface of the electrode is relative to the duty of carrying the current of the cell from one part to another of its area and the internal resistance of the cell, normally due mainly to the resistance offered by said conductive surface, can be substantially reduced. At the same time, the current bearing element offers little obstruction to access of the reactive fluids to the electrode. As a result of their unique construction, the curent bearing elements used in the fuel cells of the invention provide significant advantages over the metal screens, grids and the like which have at times been used in taking off current from fuel cell electrodes, none of which prior methods has provided the desired reduction in internal resistance in combination with low weight which has been achieved in the present new fuel cells.

The special form of foraminous sheet material used in the new fuel cells is a current carrying meshwork of crossing, i.e., criss-crossing filaments or strands. The crossing filaments are not plain woven or interlaced with one another and in that sense are weftless and nonwoven, but are disposed so that filaments extending in one direction lie wholly on one side of the sheet and filaments extending in a crossing direction lie wholly on the other side, the two sets of filaments being bonded together in any suitable way, or the filaments may be arranged, for example, as in a twill weave. Materials of this type are referred to in the art as weftless fabrics. By this mode of construction, the parallel filaments on each side of the sheet form a multiplicity of continuous channels unimpeded by the crossing filaments on the other side of the sheet. At the same time, the full length of each filament is available for electrical contact. The angle at which the filaments cross each other can be varied in the manufacture of the sheets, as can also the size of the individual filaments and the distance between the parallel filaments. As a rule it is advantageous to use filaments of about 0.01 inch to about 0.05 inch, preferably 0.015 inch to about 0.03 inch diameter with about 4 to about 20, preferably about 6 to about 12 strands per inch on each side of the sheet. In this way, channels of suitable size to conduct the reactant fluid to the electrode at an adequate rate are assured and the conductivity which gives the desired reduction in internal electrical resistance is also obtained.

The foraminous sheet material must possess good electrical conductivity and, as previously indicated, it is also desirable that it should be light in weight. For this reason it is especially advantageous to make it, not of solid metal wires, but of filaments of plastic or other light weight material which will normally be non-conductive, and then to coat the meshwork with a conductive layer of metal, e.g., by spraying or vacuum evaporation, followed by electrodeposition if desired. The metal coating used will normally be one which is resistant to attack by the electrolyte employed in the cell, for example, silver or gold. A metal thickness of up to five-thousandths of an inch will normally be sufficient but greater thickness may be used if desired. Materials suitable for manufacture of the mesh are filaments or strands derived from animal, vegetable or mineral sources, for example, regenerated cellulose and glass, or preferably filaments or strands of synthetic materials, for example, polyethylene, polyvinyl chloride, polystyrene, nylon, Perspex®, and similar plastics. Particularly useful is the polyethylene net mesh sold under the registered trademark "Netlon," and this material itself constitutes another aspect of the present invention. Tubular filaments or those having a cellular structure such as is obtained by gas generation during extrusion can be used as well as the more usual solid strands.

The present invention is particularly useful in conjunction with an electrode comprising a porous, relatively nonconductive substrate and a porous relatively conductive surface applied thereto, particularly electrodes of the kind described and claimed in copending application of K. R. Williams and D. P. Gregory, Ser. No. 34,128 filed June 6, 1960, now U.S. Patent 3,116,170, issued Dec. 31, 1963, and especially the improved form of such electrodes described and claimed by applicant in his copending application Ser. No. 301,272, filed Aug. 12, 1963, the disclosures of which applications are hereby made a part of this application by reference. As there pointed out, it is advantageous in this type of electrode to use porous substrates which can be made of polyvinyl chloride and like resins for example, having average pore diameters of about 0.25 to about 25, more preferably about 1 to about 8, microns. The porous conductive surface applied thereto should then have a thickness of at least 0.03 micron but not be thicker than twice the average pore diameter of the substrate. In this way cells of unusually high power output are obtained. Their efficiency is made even greater, however, by application to the conductive surface on the substrate of the foraminous conductive meshwork sheets provided by the present invention.

Any suitable method can be used for maintaining the new foraminous conductive meshwork sheets in secure electrical contact with the conductive surfaces with which they are being used in the cell. Firm mechanical contact is generally adequate. However, in some cases it may be desirable to use a form of construction by which the special foraminous conductive meshwork is more permanently attached to the conductive meshwork of the electrode and/or the other metal surface to which the current from the electrode is being conducted. Electrodes of the preferred type comprising a porous non-conductive substrate with a porous conductive surface on one side to which is permanently attached the foraminous conductive meshwork composed of light weight filaments with a metal coating are an example of this modification of the invention.

Application of a current bearing element in accordance with the present invention will now be illustrated with reference to the accompanying drawings which are not to scale.

Figure 1:
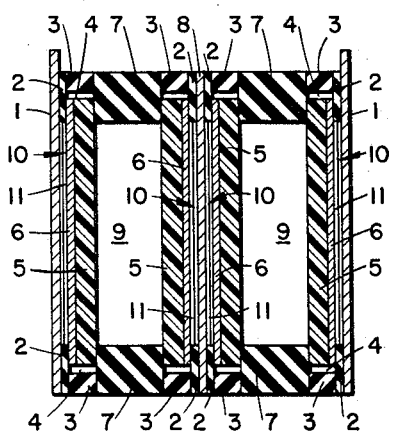
FIGURE 1 is a diagram representing a vertical section of a fuel cell on a plane at right angles to the face of the electrodes in which the new current bearing elements are used in contact with a conductive plate on one face and an electrode on the other.
Figure 2:
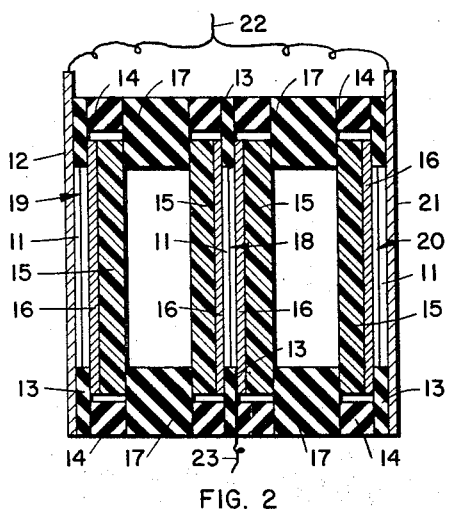
FIGURE 2 is a diagram representing a vertical section of a fuel cell on a plane at right angles to the face of the electrodes in which the new current bearing elements are used in contact with an electrode on either face.

The fuel cells illustrated in FIGURES 1 and 2 have electrodes comprising thin circular sheets but the present invention may be applied to electrodes of any shape or thickness. Furthermore, while for the sake of brevity the fuel cells illustrated in FIGURES 1 and 2 are described with reference to gaseous fuels, the current bearing elements in accordance with the present invention are equally effective in conjunction with liquid fuels and the expression "gas space" used herein describes a space which may be occupied by oxidant gas or by liquid or gaseous fuel.

Referring to FIGURE 1 of the accompanying drawings, a fuel cell has a metal end plate 1, a spacer 2 of non-conductive impermeable material, a non-conductive edge seal 3, within which and separated from it by a gap 4, is located an electrode comprising a porous relatively non-conductive substrate 5 and a porous relatively conductive surface 6. The electrode is separated, by means of a non-conductive impermeable spacer 7, from a similar but oppositely facing electrode having a porous non-conductive substrate 5 and conductive porous surface 6 which in turn is separated from a metal plate 8 by a non-conductive impermeable spacer 2. An electrolyte space 9 is defined by the pair of inwardly facing non-conductive electrode surfaces 5 and the spacer 7. A gas space 10 is defined by a conductive electrode surface 6, a spacer 2 and either a metal end plate 1 or a metal dividing plate 8. Spacers 2 and 7 contain conduits (not shown) for the passage of gas and of electrolyte into and out of the gas and electrolyte spaces respectively which they bound. Contained in each gas space 10 is a curent bearing element 11 which makes contact with the conductive electrode surface 6 and either a metal end plate 1 or a metal dividing plate 8. The cell of FIGURE 1 is shown as having four gas spaces 10, and two electrolyte spaces 9. A larger cell would be built up by replacing an end plate 1 by a metal dividing plate 8 and adding further current bearing elements, electrodes and spacers to give additional gas and electrolyte spaces, the cell being terminated by a metal end plate 1. If it is found advantageous, for example in order to increase the volume of the gas spaces, more than one current bearing element in accordance with the present invention may be used in a gas space in face to face contact with one another. The electrolyte spaces may advantageously also contain uncoated "Netlon" mesh spacers to prevent contact of the electrodes in the event that the electrolyte pressure falls. The cell is held together by means of bolts (not shown) which pass from end to end through the cell via the spacers 2, 3 and 7. In operation, the gas spaces 10 are supplied alternately with fuel gas and oxidant gas, the dividing plate 8 always separating, and the metal end plates 1 always closing, gas spaces which contain the different gases. Thus in the arrangement shown in FIGURE 1 the metal dividing plates 8 provide an internal series connection for opposite poles of the cell, thereby obviating the need for external series connections and the end plates 1 constitute a single pair of opposite terminals of the cell.

Referring now to FIGURE 2 of the accompanying drawings, a fuel cell has as before a metal end plate 12, a spacer 13, an edge seal 14, an electrode comprising a porous relatively non-conductive substrate 15 and a porous relatively conductive surface 16, a spacer 17, these components being repeated to give a battery comprising a pair of cells having a central common gas space 18. The gas space 20 is closed by means of the metal end plate 21. Current bearing elements 11 made according to the present invention are contained in the gas spaces 18, 19 and 20. The current bearing element in the gas space 18 is thus in contact on either face with an electrode, thereby making an internal parallel connection between said electrodes. In operation fuel gas is supplied to the gas spaces 19 and 20 and oxidant gas to the central gas space 18 (if desired oxidant gas may be supplied to the gas spaces 19 and 20 and fuel gas to the gas space 18). Electrolyte is supplied to the electrolyte spaces. The metal end plates 12 and 21 are connected together by a lead 22 and a lead 23 is taken from the current bearing element in the central gas space 18, thereby giving two cells connected in parallel and having one pair of similar poles connected internally. If desired, the battery can be extended by replacing either metal end plate with a further electrode and adding spacers, current bearing elements and electrodes.

Figure 3:
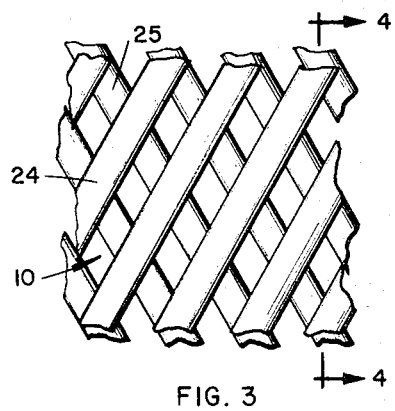
FIGURES 3 and 4 are respectively a front view of a portion of a preferred form of foraminous conductive meshwork suitable for use in the invention, and a vertical section of a part thereof showing the metal coating on the non-conductive plastic filaments from which it was made.
Figure 4:
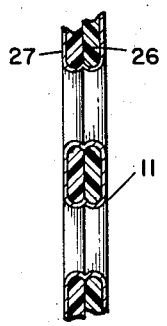

A preferred form of current bearing element 11 is illustrated in FIGURES 3 and 4, where 24 and 25 are crossing strands of the foraminous sheet. These strands are composed of light weight plastic or like strands 26 bonded together at their crossing points and coated with a conductive layer 27. The crossing filaments are not interlaced so the gas space 10 is provided with a multiplicity of continuous, unimpeded channels for the supply of reactant gas to the porous conductive surface of the electrode with which the meshwork is in contact on one side, the metal coating 27 of the network providing a low resistance conductor for withdrawal of current from the electrode.

The advantages of the invention are shown by the following results of tests carried out in cells of the same general construction but operated with and without a foraminous conductor in accordance with the present invention, which in this case was "Netlon" mesh having polyethylene fibers.

*Example 1*

Current bearing elements each consisting of a sheet of polyethylene net mesh comprising two sets of parallel filaments of polyethylene of about $\frac{1}{40}''$ in diameter spaced about $\frac{1}{8}''$ from each other, arranged at an angle of about 60° to each other and united at each crossing point, sold under the registered trade mark "Netlon" and coated by evaporative deposition with a layer of gold 1 micron thick were used as current collectors in a cell constructed as shown in FIG. 1 of the accompanying drawings. The electrodes each consisted of a sheet of microporous polyvinyl chloride of the type sold under the registered trademark "Porvic" M, on one side of which was deposited a layer of silver approximately 1 micron thick and thereafter a layer of platinum black catalyst to the extent of 5 mgms per sq. cm. A comparative cell in which the current bearing elements were replaced by metallic current collectors of substantial section, provided with lugs projecting through the non-conductive spacers 2 to facilitate current collection, and having their central portions extensively cut away in order to permit access of fluids to the catalyst surface of each electrode, was constructed. Both cells were operated on air as oxidant and methanol as fuel, the electrolyte being 6 N sulphuric acid and the operating temperature being 30° C. The cell containing current bearing collectors in accordance with the present invention gave, for the same current, a voltage which was 20% higher than the voltage given by the comparative cell containing current bearing collectors of substantial metal section.

*Example II*

A cell containing current bearing collectors in accordance with the present invention constructed as described in Example I except that the layer of gold on the polyethylene net mesh was ½ micron thick and the catalyst for the fuel electrode was a mixed platinum/ruthenium-black catalyst containing 95% by wt. of platinum and 5% by wt. of ruthenium gave when operated on air as oxidant, methanol as fuel and 6 N sulphuric acid as electrolyte, a voltage which was 30% higher for the same current then the voltage given by a comparative cell in which the current bearing elements were replaced by metallic current collectors of substantial section.

*Example III*

In a fuel cell constructed as shown in FIG. 1 of the accompanying drawings, current bearing elements consisting of a sheet of polyethylene net mesh sold under the registered trademark "Netlon" and coated with a layer of gold 1 micron thick were replaced by sheets of expanded unplasticised polyvinyl chloride approximately $\frac{1}{40}''$ thick, marketed under the registered trademark "Expamet" i.e. sheets wherein foramina had been formed by cutting a plurality of parallel slits each approximately ⅛" in length and spaced approximately ⅛" apart from each other in a continuous sheet of unplasticised polyvinyl chloride, and pulling the sheet in a direction approximately at right angles to the length of the slits, i.e. a foraminous sheet not in accordance with the present invention, coated by evaporative deposition with a layer of gold 1 micron thick. Pressure drop measurements were made when electrolyte was passed through the fuel compartment of the cell. The pressure drop was found to be 100% higher than when the fuel compartment contained a current bearing element in accordance with the present invention.

It will be understood that the invention is not limited to the fuel cells which have been described by way of illustration, since it can be applied with advantage with other types of fuel cells which have a conductive electrolyte in contact with a pair of porous electrodes to which are supplied, respectively, the fuel and oxidant from which the power is generated. It is especially advantageous, as already noted, for fuel cells having porous electrodes. Suitable fuel gases are hydrogen, carbon monoxide, gaseous hydrocarbons such as methane, ethane, etc., or vaporised higher hydrocarbons, while examples of suitable liquid fuels are methanol, formaldehyde, hydrazine or mixtures thereof. Air or oxygen are preferred oxidants but others may be used together with or in place of these gases. Porous electrodes which have a conductive surface which contains a catalyst for the particular electrode reaction are particularly useful. Silver, gold, palladium, platinum, osmium, iridium, rhodium, manganese, copper, nickel, and lead are examples of suitable conductive materials for the electrodes. Any of the previously referred to types of electrolytes may be used in the cells. Basic solutions, for instance sodium or potassium hydroxide of about 4 to 8 normal concentration are useful as are also aqueous acids such as sulfuric, phosphoric or hydrochloric acids of about 2 to 20 normality. It will thus be seen that the invention is widely applicable.

I claim as my invention:

1. In a fuel cell having a pair of electrodes in contact with a common electrolyte, spaces adjacent to a conductive face of each electrode for supplying reactant fluids thereto, at least one of said spaces containing a foraminous conductive weftless fabric in face-to-face contact with the conductive surface of the adjacent electrode, said fabric having criss-crossing filaments forming a multiplicity of unimpeded channels along which the reactant fluid contacts said electrode, said filaments being in direct electrical contact with said conductive face of the electrode and with a conductor through which generated electricity is withdrawn therefrom.

2. A fuel cell having a porous electrode with a gas space on one side and an electrolyte on the other, a foraminous conductive weftless fabric in said gas space composed of two sets of filaments, those extending in one direction lying in parallel on one side of the sheet only with criss-crossing filaments being wholly on the other side, the full length of the filaments on the electrode side being in electrical contact with a conductive face of said electrode and the full length of the criss-crossing filaments on the other side being in contact with a conductive surface forming forming the opposite wall of the gas space.

3. A fuel cell in accordance with claim 2 wherein the foraminous conductive weftless fabric is constructed of light weight relatively non-conductive fibers which cross at an acute angle to each other and are bonded together and covered with a thin layer of conductive metal.

4. A fuel cell in accordance with claim 3 wherein the foraminous conductive weftless fabric is made of polyethylene fibers covered with a metal of the group consisting of silver and gold in a thickness of about one- to five-thousandths of an inch.

5. A fuel cell having a pair of porous electrodes formed with a porous conductive metal layer on one face of a relatively non-conducting support, an electrolyte space between the inwardly facing non-conductive surfaces of the two electrodes, gas spaces on the outwardly facing porous conductive surfaces of each electrode, two sets of conductive, spaced apart, parallel filaments in each gas space, one set of filaments contacting throughout their length the conductive electrode surface, the other set of filaments criss-crossing the first set at an acute angle, lying wholly on the side of the first set opposite that in contact with the electrode, and being in electrical contact with a conductive surface forming another side of the gas space, said sets of filaments being in electrical contact with each other so that current from the conductive electrode surface is conducted to said other side of the gas space.

6. A gaseous fuel cell in accordance with claim 5 wherein internal parallel connection between two electrodes is provided by a foraminous conductive weftless fabric composed of said two sets of conductive filaments, each set contacting a conductive electrode surface, and the filaments forming a multiplicity of unimpeded channels whereby reactant gas is conducted to these electrode surfaces.

References Cited

UNITED STATES PATENTS

| | | | |
|---|---|---|---|
| 2,720,076 | 10/1955 | Sachara | 117—227 X |
| 3,116,170 | 12/1963 | Williams et al. | 136—86 |
| 3,215,562 | 11/1965 | Hindin | 136—86 |

ALLEN B. CURTIS, *Primary Examiner.*

WINSTON A. DOUGLAS, *Examiner.*